Oct. 7, 1924.

J. O. CADIEUX

MOUNTING FOR LIGHTS

Filed June 27, 1923

1,511,190

INVENTOR
Joseph O. Cadieux
ATTORNEY

Patented Oct. 7, 1924.  1,511,190

UNITED STATES PATENT OFFICE.

JOSEPH O. CADIEUX, OF MERIDEN, CONNECTICUT, ASSIGNOR TO THE CONNECTICUT TELEPHONE & ELECTRIC COMPANY, INCORPORATED, OF MERIDEN, CONNECTICUT, A CORPORATION OF CONNECTICUT.

MOUNTING FOR LIGHTS.

Application filed June 27, 1923. Serial No. 647,993.

*To all whom it may concern:*

Be it known that I, JOSEPH O. CADIEUX, a citizen of the United States of America, residing at Meriden, New Haven County, Connecticut, have invented a new and useful Mounting for Lights, of which the following is a specification.

My invention relates particularly to what is sometimes termed a dome light.

One object is to provide a simple, neat construction in which all screws or other devices for fastening the base to the wall are concealed. Another object is to provide a construction which may be conveniently mounted with its edges horizontal or inclined.

Figure 1:
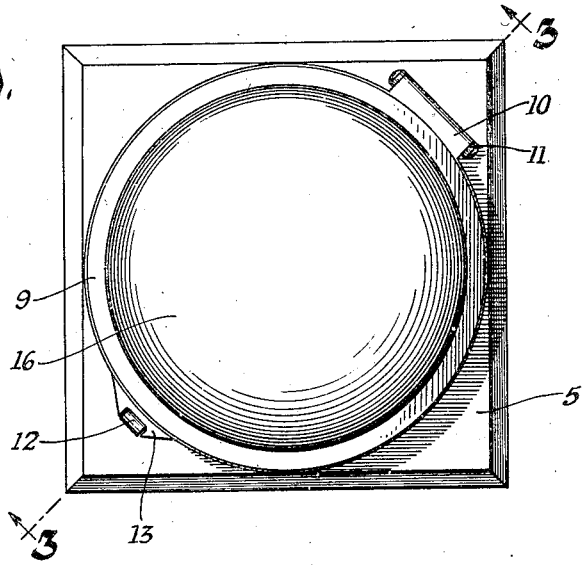
Figure 1 is a front view of a preferred construction embodying one design of my invention and showing the glass and frame in place with the edges of the base horizontal.

The base 5 may be of metal of any suitable design and is adapted to support a socket 6 which is attached to it in any suitable manner as for instance by screws 7. The socket 6 is intended to carry some suitable form of lamp bulb 8.

The frame 9 has a lug 10 pivoted or hinged to the lugs 11 which may conveniently be formed by striking up portions of the base.

Figure 3:
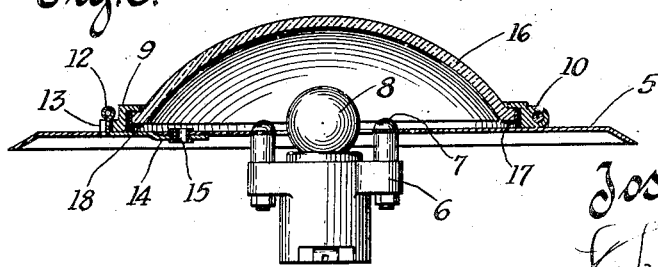
Fig. 3 is a sectional view on the plane of the line 3—3 of Fig. 1.

A spring catch 12 is provided for engaging a lug 13 on the cover frame and holding it securely in place but in such a manner that by releasing the catch the cover may be opened. This catch can conveniently be formed from a strip of metal bent as shown in Figure 3 and having an arm or shank 14 secured to the rear of base 5 for instance by means of a rivet 15.

The frame carries a suitable glass 16 which may conveniently be held in place by means of clips such as 17 and 18.

Figure 2:
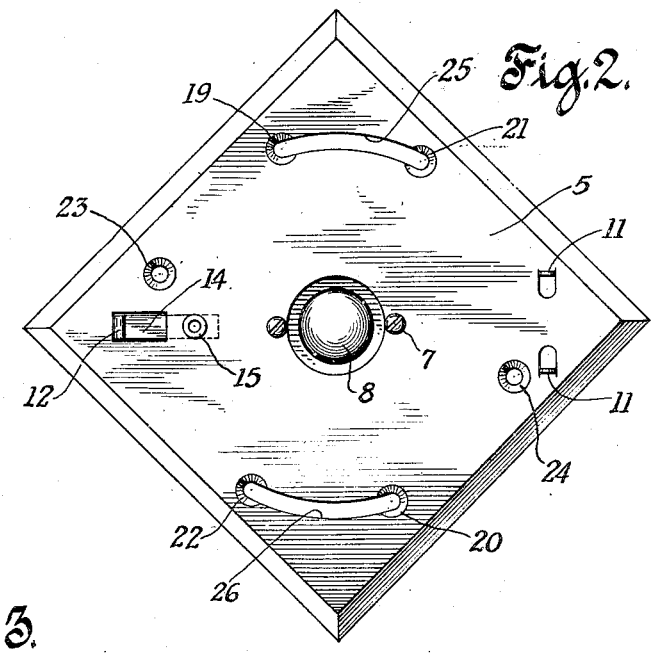
Fig. 2 is a front view of the base turned at an angle of 45° from that shown in Fig. 1, the glass and frame being removed.

To permit the base to be secured to the wall or ceiling or other suitable support, I provide a plurality of holes for mounting screws. These holes may have seats such as 19, 20, 21, 22, 23, and 24 for the heads of the screws. Ordinarily two pairs of screws are sufficient for securely mounting the base in position, but by providing additional holes and connecting certain of the holes, for instance by slots such as 25 and 26, it may be made convenient to mount the base in the position shown in Fig. 1 or that of Fig. 2, or to change the angular position very readily at any time. For instance, if we consider that the base is secured to the wall in the position of Fig. 2 by screws (not shown) in the holes 19 and 20, it is obvious that when the screws are somewhat loosened the base may be readily rotated anti-clockwise to the position shown in Fig. 1 so that the screws may then be tightened with the heads in the seats 21 and 22. The change of position can thus be readily made without removing the base from the wall. Accidents and mistakes can thus be avoided. In case the slots 25 and 26 are omitted it would of course be necessary to remove the screws entirely in order to angularly adjust the base.

It will be noted that the parts are so designed and constructed that the frame 9 and cover glass 16 completely conceal all of the mounting screws as well as the catch rivet 15 so that there is no unsightly screw-head or mounting device visible when the cover is in place. This method of mounting the cover also makes it possible to very readily replace a lamp without the use of any tools.

I claim:

1. A dome light construction comprising a base, a lamp socket carried thereby, said base having arcuate slots on opposite sides of said socket to receive mounting screws and having seats for the screws at the ends of said slots so that the base may be held firmly in position in either of its extreme positions, and a cover glass secured to said base and covering said slots and seats.

2. A dome light construction comprising a square base having on opposite sides of its center arcuate slots adjacent to one diagonal, screw seats at the end of said slots, and screw seats adjacent opposite ends of the other diagonal to correspond with two of the seats at the end of said slots, a lamp socket centrally positioned in said base, and a cover secured to said base and covering said slots and screw seats.

3. A dome light construction comprising an angular base having hinge lugs in one corner, a spring latch mounted in the opposite corner, pairs of screw seats arranged in angular relation to each other in the intervening corners, a lamp socket centrally positioned on said base and projecting rearwardly therefrom and a cover glass hinged to said lugs and coacting with said latch.

4. A dome light construction comprising a flat base plate having a central lamp passage, two outstanding lugs at one side thereof, a spring catch riveted to the back of the base plate at the opposite side of the lamp passage and having its outer end extending through the base plate, a lamp socket secured at the rear of the lamp passage, and a glass cover hinged to said lugs and yieldingly engaged by said catch.

5. A dome light construction comprising a base, a lamp socket carried thereby, said base having arcuate slots on opposite sides of said socket to receive mounting screws and a cover glass secured to said base and covering said slots.

6. A dome light construction comprising a square base having hinge lugs in one corner, a spring latch mounted in the opposite corner, pairs of screw seats arranged in angular relation to each other in the intervening corners and a cover glass hinged to said lugs and coacting with said latch.

JOSEPH O. CADIEUX.